United States Patent

[11] 3,601,543

[72] Inventors Maurice M. Maniere;
Henri L. Tambutte, both of Paris, France
[21] Appl. No. 20,323
[22] Filed Mar. 17, 1970
[45] Patented Aug. 24, 1971
[73] Assignee Lignes Telegraphiques Et Telephoniques Paris, France
[32] Priority Mar. 21, 1969
[33] France
[31] P.V. 08241

[54] TIME DIVISION DATA TRANSMISSION SYSTEM
10 Claims, 6 Drawing Figs.

[52] U.S. Cl. ........ 179/15 AL, 178/69.5, 340/183
[51] Int. Cl. ........ H04j 3/08
[50] Field of Search ........ 179/15 AL, 15 BD, 15 BS, 15 BY; 178/69.5 R; 340/183

[56] References Cited

UNITED STATES PATENTS

| | | | |
|---|---|---|---|
| 2,406,165 | 8/1946 | Schroeder | 179/15 AL |
| 2,723,309 | 11/1955 | Lair | 179/15 AL |
| 3,517,130 | 6/1970 | Rynders | 179/15 BY |

*Primary Examiner*—Ralph D. Blakeslee
*Attorney*—Abraham A. Saffitz

ABSTRACT: A time division binary-coded data transmission system using two parallel and juxtaposed transmission lines, with a number of sending and receiving stations distributed along said lines and coupled to both of them. The first line transmits synchronization frames supplied by a central station, and the second one the information. The system is characterized in that at each sending station, the information signals transmitted by the second line are derived from the synchronization signals transmitted by the first, by means of a coupling circuit modulating the latter signals according to the coding conditions of the data to be transmitted, without altering the essential features of their waveshape. Thanks to this arrangement, the total lengths of line through which synchronization and coded data signals are transmitted are the same, and the thus preserved similarity of their waveshapes allows correct demodulation of the latter by simple comparison with the former.

INVENTORS:
MAURICE M. MANIERE
HENRI L. TAMBUTTE
By: Abraham A. Saffitz
ATTORNEY

[redacted]
MAURICE H. MANIERE
HENRI L. TAMBUTTE
BY: Abraham A. Saffitz
ATTORNEY

INVENTORS:
MAURICE M. MANIERE
HENRI L. TAMBUTTE
BY: Abraham A. Saffitz
ATTORNEY

INVENTORS:
MAURICE M. MANIERE
HENRI L. TAMBUTTE
BY: Abraham A. Saffitz
ATTORNEY

TIME DIVISION DATA TRANSMISSION SYSTEM

This invention relates to the transmission of binary-coded data over electric lines in a time-sharing system comprising at least one transmitting station and at least one receiving station, each transmitting station being connected by at least two transmission lines to one or more receiving stations and each receiving station being connected by the transmission lines to one or more transmitting stations.

Data transmission facilities of the kind of interest here are of course very useful for transmitting all kinds of d data between various sections of a large scientific or industrial or business organization or a large general utility concern, e.g., in transportation and power transmission. The need for transmission systems of this kind are bound to increase in number and scope in the course of time, and reducing the first cost of installations may help considerably to speed up development. The invention therefore relates to a simple and economic system of the kind hereinbefore defined.

Among the known system we would refer more particularly to various data transmission systems using common transmission lines interconnecting a number of transmitting and receiving stations, the aim being to reduce first costs, much of which is taken up by the cost of the cables used for the lines.

One system of this kind is disclosed e.g. by French Pat. specification No. 1,297,880 for a "Connecting facility between a transmission line and send-receive stations," although in this case a transmission line can be used for only one communication at a time, the unused line portion being disconnected.

In time-sharing systems all the calls can proceed consecutively and cyclically in short consecutive time slots allotted to the various calls, the cycle restarting whenever all the calls have been set up. One such system is described in an article by J. J. Cofer, Jr., entitled "Saving Money on Data Transmission as Signals take turn on party-line" in the American Journal ELECTRONICS, Volume 41, No. 8, 15 Apr. 1868, pages 119–123, wherein a number of transmitting stations and a number of receiving stations are coupled together in pairs and are individually connected to a single two-wire transmission line which in cooperation with earth provides two transmission circuits, one being used for data signals and the other for sync signals; any calls between two stations has a coded address allotted to it.

In this system transmission is based on the cyclic transmission of signal sequences of the same total duration each comprising a code group (to free the line), an "address" group, and data groups. The various call addresses are included in the respective consecutive sequences and the cycle restarts once all the calls have been made. The address encoder, transmitter and receiver constructions are based on digital and logic circuits, all of which are connected directly between the two wires forming the single line.

This invention also relates to a method of and facilities for transmitting and receiving data signals between a number of transmitting and receiving stations using a common transmission channel, of simple and low-cost construction, of use inter alia for stations grouped fairly close together with between-stations distances not exceeding, for instance, a few miles.

Before defining the invention and particularising its features, we shall first outline some generally known characteristics of time-sharing data transmission systems. In most systems of this kind, a periodic sync signal is used which is transmitted in the form of "sync frames" having a period equal to the duration of the operating cycle and repeating continuously; each frame comprises a characteristically shaped "-start signal" followed by a predetermined number N of periods of a periodic signal forming the same number of bits having an individual constant duration and identified in each frame by their respective ranks numbered from 1 to N according to the order of their sequence in time. To transmit information in such systems, a group of signals having a particular rank in each frame is briefly allotted to a "predetermined call"—i.e., a call between a particular transmitting station and a particular receiving station. The various groups of frame bits are therefore allotted to the various calls of the system on the basis of a fixed time distribution, each call therefore having its own "address" consisting of a combination of bits of predetermined ranks preceding the actual information-conveying message. The destination receiving station can be identified by means of a simple specific logic representation obtained from all the binary values of the signal. Thanks to this logic representation, an address can be encoded and decoded and the message can be routed to the selected receiving station.

The sync signal recurrence frequency F, the duration T of each bit, the number N of the bits and the manner in which the same are distributed between different addresses are different in different systems. The ways and means of determining such factors are outside the scope of this invention; it will merely be stated here that the frequency F is chosen to be of a very much higher order of magnitude than the data transmission rate of the peripheral facilities (information sources) of the system and that the value of N is one factor determining the choice of F.

The system according to this invention differs from earlier systems in that in the system according to the invention the various possible connections between any transmitting station and any receiving station are made by allotting every receiving station a different time slot in the time-sharing cycle. To make a call between any transmitting station and a selected receiving station, the transmitting station selects, e.g. on a manual keyboard, the time slot corresponding to the selected receiving station, with the result that the signals from that particular transmitting station are automatically transmitted in the appropriate time slot.

If it is required to transmit a single message from any one transmitting station to a number of receiving stations, the transmitting station similarly selects the various time slots corresponding to the particular receiving stations concerned, and the message is repeated consecutively in the various time slots thus selected. The system according to the invention therefore needs no address decoder at the receiving station.

As in some of the known systems, the system according to the invention uses two transmission lines, one for sync signals and the other for messages formed by the transmitted data, but the system according to the invention differs from the earlier systems by the means for producing the data signals; these are derived at each transmitting station from the sync signals received thereat from a central station continuously transmitting the sync signals, on the basis of various modifications of the sync signals according to which of the binary values is required for the data signals.

This invention provides a cyclic time-sharing multiplex data transmission system in which data are transmitted by coded bits which have a constant duration T and which have one or the other of two different binary values, with the use of two juxtaposed transmission lines having substantially identical electrical characteristics, and a number of transmitting and receiving stations distributed along the lines and coupled with both of them, the first line being used for the transmission of sync frames delivered by a central generating station and repeated periodically in each operating cycle, the second line being used for the transmission of data signals, any communication between any transmitting station and any receiving station being in a time slot selected in each operating cycle, each sync frame comprising a start signal of predetermined waveform and duration, followed by a number N of elementary sync signals each having the same individual time constant T and the same waveform as those of the data bits having one of the binary values, characterized in that the binary value of each bit received at the receiving station is identified by means of comparing such bit with the sync bits; the data bits having the first or second binary value are produced in each transmitting station from the sync bits by coupling means between the first line and the second lines; and the coupling means are controlled by the binary value of each of the data items delivered by a source of data to be transmitted.

According to a first feature of the invention, the data signals having the second binary value are zero signals.

According to another feature of the invention, the data signals having the second binary value are produced by inversion of the signals having the first binary value.

One of the advantages of the system according to the invention, in cases in which a number of transmitting and receiving stations are connected at intervals to various places on the first and second transmission lines, is that the total length of the path travelled by the signals received at the receiving station from the central sync-singal-generating station, including passing through the transmitting station, is independent of the positions of the particular transmitting and receiving stations concerned in the call, so that wherever such stations may be, distortions of the received data signals and of the sync signals due to line properties is the same. This feature is the result of the various signals hereinbefore mentioned all having a common waveform.

Preferably, a transmitting station comprises a facility having a gating circuit inductively coupled with both the first and second transmission lines and comprising a one-way analog gating circuit to produce the data signal by gating from the first line to the second line, a number of logic circuits being provided which make such gate conductive only during those parts of the operating cycle which correspond to the required call and only when the data which it is required to transmit has a particular one of the binary values, conventionally called, for instance, "one." In this case the second binary value is the value of a zero signal.

Preferably too, a receiving station comprises a facility having a gating circuit inductively coupled with both the first and second transmission lines, a comparator circuit having two inputs coupled with the gating circuit for continuous comparison of the signals received from the first and second lines, a sampling circuit (for each call to such receiving station), and a group of logic circuits for sampling the signal resulting from comparison at appropriately selected times during each of the portions of the operating cycle allotted to one such call.

Other features and advantages of the system according to the invention will be more clearly understood from the following description of a nonlimitative embodiment of the invention, reference being made to the accompanying drawings wherein.

Figure 2:
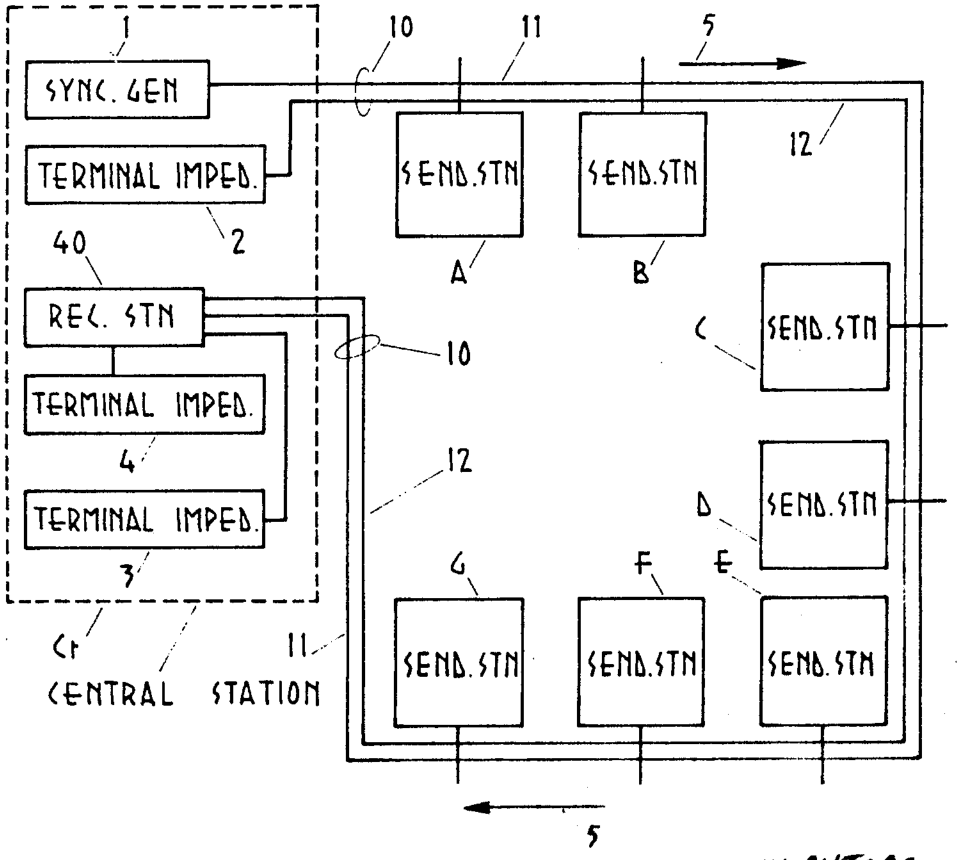
FIG. 2 shows a data transmission system of the kind shown in FIG. 1 according to a feature of the invention.
Figure 3:
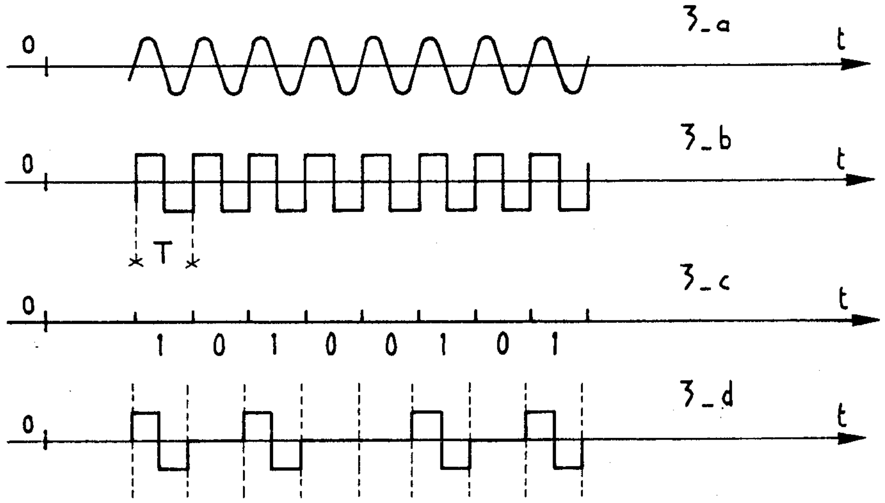
Figure 4:
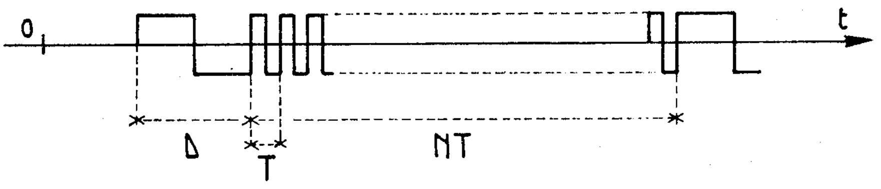
Figure 5:
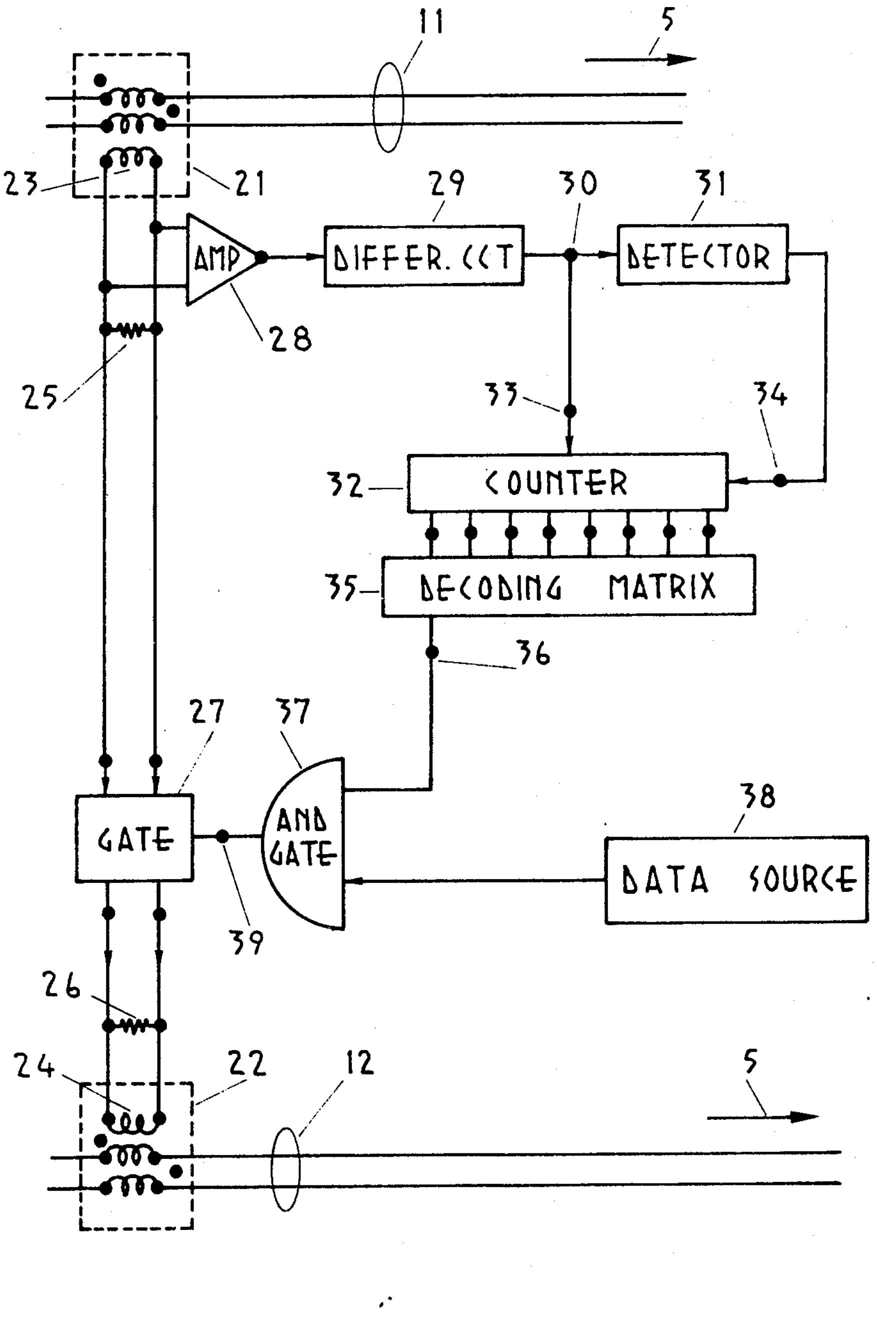
Figure 6:
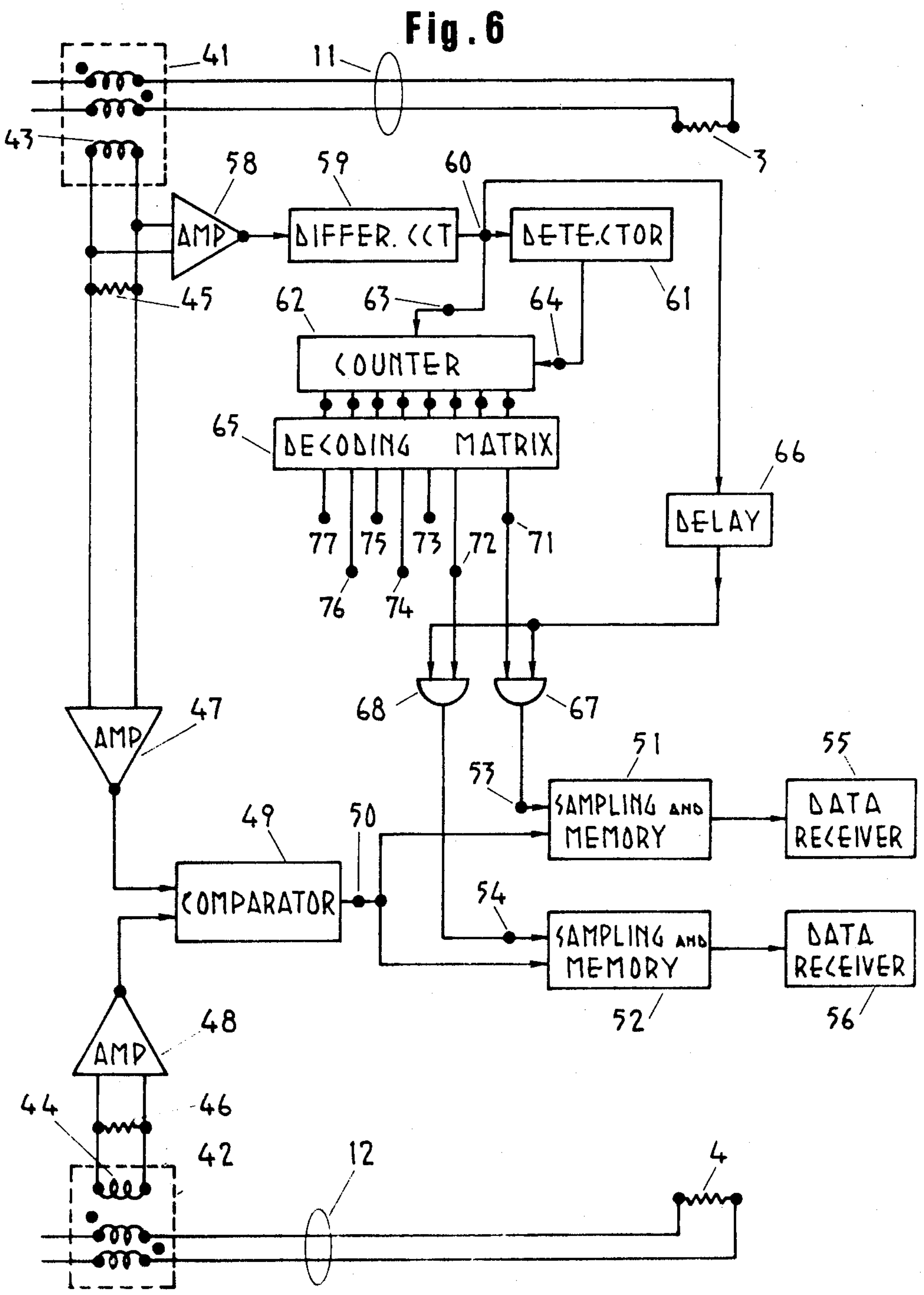

FIG. 3 consisting of four diagrams *3a–3d*, and FIG. 4 show the waveforms of the sync and data signals used in the system shown in FIG. 2;

FIG. 5 is a schematic diagram of a transmitting station electronic facility, and FIG. 6 is a schematic diagram of a receiving station electronic facility.

Figure 1:
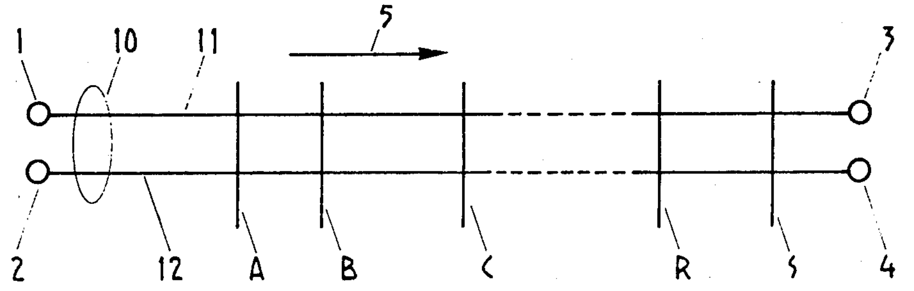
FIG. 1 is a simplified diagram of a data transmission system using two common lines.

FIG. 1 is a view in diagrammatic form showing two transmission lines formed by a quad 10 comprising two conductor pairs each denoted by an ordinary line 11, 12. At the line ends the pairs 11, 12 are coupled with circuits 1–4 which will be described hereinafter. The lines A, B, C and so on represent transmitting stations and the lines R, S and so on represent receiving stations. Pair 11 is for sync signal transmission and pair 12 for data signal transmission.

Circuit 1 is the central generator which supplies the system sync signal; circuit 3 is a passive (nonreflecting) terminal circuit whose impedance is equal to the characteristic impedance of pair 11; the sync signal travels in the direction indicated by an arrow 5 and is not reflect at the end 3. Similarly, circuits 2, 4 are passive circuits whose impedance is equal to the characteristic impedance of pair 12; data signals output by the transmitting stations travel to the destination receiving stations in the direction indicated by the arrow 5.

The transmission characteristics of the pairs 11, 12, inter alia their characteristic impedances, have by construction substantially equal values everywhere in the quad 10 and over each fraction of the length of the quad 10. The sync and data signals are propagated in exactly the same way as one another and for any given propagation path the phase shifts and distortions of both kinds of signal are substantially the same. It can therefore be assumed that the waveforms nd respective binary states of the signals of both kinds received by any receiving station are identical or different according as such signals were identified or different when applied to the lines from a transmitting station. To ensure this, however, total signal distortions must not be excessive; preferably, the lines used have a total length of less than 10 kilometers (6 miles).

FIG. 2 is a diagrammatic view showing how a complete system of the kind shown in FIG. 1 can be devised for the case in which both ends of the lines can be advantageously set up very close together. The system comprises a single receiving station 40 near the first line end (circuits 1 and 2); quad 10 is coupled with station 40 very near the second end where the circuits 3, 4 are disposed. The sync generator 1, receiving station 40 and impedances 2–4 are all installed in the same place and the resulting group forms an important item of the transmission system; this item is shown inside the rectangular framing *Ct* and is sometimes referred to as the "central station." Also visible are transmitting stations A–G at various places along the transmission line (quad 10); in each transmitting station an electronic transmitting facility if coupled with the line by circuits which will be described hereinafter.

FIG. 3 shows the preferred signal waveform according to the invention in the embodiment described; the sync generator 1 (FIG. 2) delivers a very-stable-frequency sinusoidal wave shown in diagram *3a*; from this wave a rectangular signal, visible in diagram *3b*, is formed which has the same period and which is used as sync signal for the data transmission system; the period T is the duration of one bit.

Diagram *3c* shows the limits of the durations of the consecutive bits and for each of them, as an example, the binary value (1 or 0 in the diagram) of the signal which it is required to transmit for each such duration. According to the invention, to transmit the sequence of binary values shown in diagram *3c*, the data signal waveform is of the kind shown in diagram *3d*.

FIG. 4 shows the makeup of a sync frame, which comprises a start signal of duration D and N consecutive bits each having the individual duration T; total frame duration is (D+NT). D is large relatively to T, so that the start of a frame can be identified by means of an appropriate circuit.

FIG. 5 is a schematic diagram showing the transmission facility of any of stations A to G. There can be seen the lines 11, 12 and the signal (sync and data) direction arrow 5. The facility comprises two transformers 21, 22 for coupling the facility with the lines 11, 12. Each transformer has two primary windings which are wound in opposite directions and which are connected in series with the conductors of the corresponding line, and a respective secondary winding 23, 24, a respective resistance 25, 26 being connected across each secondary winding to form a load circuit.

Connected between the pairs of terminals belonging to 23, 25 and 24, 26 respectively is a unidirectional analog gate circuit 27 whose input is connected to the terminals associated with the facilities 23, 25 and whose output is connected with the terminals associated with the facilities 24, 26; the gate is controlled via terminal 39. The operation of circuit 27 will be described hereinafter.

Since the primary windings of the transformers 21, 22 are connected in series with the conductors of the lines 11, 12, transmission along a line is not interrupted when passing through a station; also, the facility is sensitive to variations in the current flowing through the line 11; the signals output by circuit 27 are transmitted to line 12 as a result of a current variation in the secondary winding 24.

Consequently, when the analog gate is conductive, a signal of the same waveform as the sync signal in line 11 is transmitted to line 12. The signal thus transmitted corresponds to the first binary value of the data signal, the second binary value (gate 27 closed (nonconductive)) being distinguished by an absence of signal.

Variations are of course possible; for instance, the two binary values of the transmitted data signal can be represented by signals having the same waveform as, but the opposite polarity to, the sync bit. A circuit to be used instead of the gate 27 to achieve this result can readily be imagined.

To simplify the description it will be assumed hereinafter that the second binary value of the data signal is distinguished by zero signal (absence of signal).

The coupling provided by the transformer system 21, 22 must not appreciably disturb the current conditions (amplitude, phase) in the conductors of the lines 11, 12. This, of course, is achieved by known techniques by the transformer having a series input impedance ("seen" from the terminals of its primary winding) whose real part is considerably greater than its imaginary part and whose modulus is very small relatively to the characteristic impedance of the lines 11, 12. The coupling coefficient between the primary and secondary windings is near unity (close coupling) and the self-inductance of the windings is relatively small, the value of the resistance 25 or 26 being the main factor in determining such input impedance. The resistances 25, 26 have a value of a few ohms, and so a series input impedance corresponding to about 5 percent of the characteristic impedance is obtained.

The signals at the terminals associated with the facilities 23, 25 are small and are amplified before use in a linear amplifier 28 whose input impedance is very large as compared with the resistance 25. The amplifier output controls a time differentiation circuit 29 delivering at 30 a sync pulse, which is of short duration relatively to T, each time that the front edge of each of the bits in a sync frame passes through zero in a given direction. Output 30 is connected to the input of a circuit 31 comprising means for identifying the frame start signal of duration D (FIG. 4) and for outputting at the termination thereof—i.e., immediately before the rising transition of the first bit of duration T of the sequence of N such frame signals (see FIG. 4)—a control pulse whose duration is short as compared with T.

Circuit 32 in FIG. 5 is a binary counter (having *p* stages with $2^{p11}$ equal to or greater than N) which counts the pulses delivered by the circuit 29 and applied to the stepping-on input 33; a zero resetting input 34 is connected to the output of circuit 31. The outputs of the stages of counter 32 are connected to the inputs of a decoding matrix 35 (in FIG. 5 the counter is shown in simplified form as a four-stage counter).

Since there is only a single receiving station in the system shown in FIG. 2, only one call can be made from each of the transmitting stations during an operating cycle, and so a given transmitting station of the kind shown in FIG. 5 can be given a time slot of any rank in the operating cycle. Accordingly, the matrix 35 of FIG. 5 has an output 36 at which a signal is delivered, as a result of decoding in the matrix 35, throughout the time that the computer displays the various consecutive counting states included in the particular time slot concerned.

A logic (AND) gate 37 has one input connected to output 36 of matrix 35 and another input connected to the output of a peripheral transmitting facility 38 of the transmitting station; the output of circuit 37 is connected to actuating input 39 of circuit 27. The same can be rendered conductive, in the direction from 25 to 24, by an electric signal applied to input 39 and comprises power amplification means to ensure that the signals which it outputs (at the terminals of 24 and 26) are strong enough.

During any time interval when circuit 27 is conductive, the sync signal flowing through the primary winding of 21 (on line 11) produces, as a result of the two inversions provided by 21 and 22, a different signal in the primary windings of transformer 22, the latter windings being connected to line 12. Such other signal, whose waveform is similar to sync signal waveform, is transmitted to line 12. Circuit 27 is conductive during those parts of the operating cycle which correspond to the required call provided that the data item which it is required to transmit and which has been output by the facility 38 is in the form of a signal of appropriate binary value, e.g., 1, applied to whichever input of 37 which is connected to 38.

FIG. 6 is a schematic diagram of the receiving station 40 (FIG. 2) forming part of the central station *Ct* of FIG. 2. In FIG. 2 the lines 11, 12 have their other ends connected to respective matching impedances 3, 4. The receiving facility shown in FIG. 6 is coupled with line 11 and line 12 through the agency of two transformers 41, 42 respectively having similar characteristics to the transformers 21, 22 shown in FIG. 5. Secondary windings 43, 44 are loaded by resistances 45, 46 similar to the resistance 25, 26 shown in FIG. 5. Circuits 47, 48 are two linear amplifiers whose inputs are connected to the terminals of the resistances 45, 46 respectively, the input impedances of the circuits 47, 48 being large relatively to the resistances 45, 46. A signal comparator circuit 49 has two inputs connected one each to the outputs of the circuits 47, 48, and an output 50; circuit 49 outputs a signal only when the signals applied to both its inputs both have the same signalling condition—e.g., both such signals are positive or both such signals are negative, etc.

The couplings devised as hereinbefore described make the receiving facility shown in FIG. 6 sensitive to variations in the currents flowing through the conductors of the lines 11, 12.

Circuit 58 is a linear amplifier whose input impedance is of the same order of magnitude as the input impedances of circuits 47, 48; also visible are a time differentiation circuit 59 and a frame start signal detection circuit 61; the circuits 58, 59, 61 have the same functions and characteristics as the circuits 28, 29, 31 respectively of FIG. 5. Binary counter 62 is similar to the facility 32; matrix 65 is similar to matrix 35 of FIG. 5 but in this case has seven outputs 71–77 each corresponding to a different sequence of counting states and to one of the seven possible calls in the system between any of the seven transmitting stations A, B, C, D, E, F, G (FIG. 2) and the receiving station 40; a signal appears at one of the outputs 71–77 for any state of the counter 62 corresponding to such part of the operating cycle as is allotted to the corresponding call.

Circuit 66 is a delay circuit having a delay corresponding to a fraction of the duration of a bit—i.e., of T—for instance, about one-third or two-fifths of T, so as to remove all doubt about the value of the signal sampled during such duration.

Circuits 67, 68 are AND Circuits; one input of each such circuit is connected to the output of 66; their second input is connected to one of the outputs of the matrix, e.g. 71 or 72, in FIG. 6, the matrix having only two AND-circuits. To simplify the drawings, the AND-circuits for the other matrix outputs are not shown.

The circuits 51, 52 comprise sampling facilities and storage facilities each for sampling the signals corresponding to a particular call; there are seven circuits, only two of which, the circuits 51 and 52, are shown. Each such circuit has two inputs, the first of which is connected to the output 50 of circuit 49 and the second—in this case 53 or 54—of which is connected to the output of one of the AND circuits 67 or 68 respectively.

Each circuit 51, 52 has an output connected to the input of a peripheral receiving facility 55, 56 etc.; each of the latter operates for a system call to the station 40; only two peripheral facilities are shown in FIG. 6.

Operation of the transmission and receiving facilities can be explained simply on the basis of the descriptions given in the foregoing.

For transmission—except for the condition given hereinafter—a signal is transferred via the transformers 21, 22 and the circuit 27 from the first (sync) line to the second (data) line during those parts of each operating cycle which are allotted to the particular call concerned through the agency of the time differentiation circuit 29, counter 32 and matrix 35, this transfer or gating occurring only if the value of the data to be transmitted is the chosen one of the two possible binary values, for instance, the value "one," of the signals which the facility 38 applies to the input of circuit 37.

At reception, (FIG. 6), the signals present on the two channels (sync and data) are transmitted via the transformers 41, 42 and amplifiers 47, 48 to the inputs of the comparator circuit 49; the comparison signal output by circuit 49 is sampled in the circuits 51, 52 etc. allotted individually to the reception of data from a particular transmitting station; each such circuit 51, 52 etc. respectively carries out sampling during those parts of the operating cycle which are allotted to each call, such parts being identified through the agency of the differentiation circuit 59, counter 62 and matrix 65, the sampling control signals being applied via the AND-circuits 67, 68 from the outputs of matrix 65 and from the output of the delay circuit 66.

The system according to this invention and the facilities and means of embodying the same, for instance, the use of a quad, are of outstandingly simple construction and low cost and are very convenient and flexible in use. For instance, the feature of series-inductive coupling with the line by means of relatively low-impedance devices facilitates the provision and commissioning as and when required of new stations at selected and prepared places along existing lines without operating of the overall system being affected.

What is claimed is:

1. A cyclic time-sharing multiplex data transmission system in which data are transmitted by coded bits which have a constant duration T and which have one or the other of two different binary values, said system using two juxtaposed transmission lines having substantially identical electrical characteristics, and a number of transmitting and receiving stations distributed along said lines and coupled with both of them, the first line being used for the transmission of sync frames delivered by a central generating station and repeated periodically in each operating cycle, and the second line being used for the transmission of data signals, any communication between any transmitting station and any receiving station being in a time slot selected in each operating cycle, each sync frame comprising a start signal of predetermined waveform and duration, followed by a number N of elementary sync signals each having the same individual time constant T and the same waveform as those of the data bits having one of the binary values; and in which the binary value of each bit received at the receiving station is identified by means for comparing such bit with the sync bits; the data bits having the first or second binary value are produced in each transmitting station from the sync bits by coupling means between said first and second lines; and said coupling means are controlled by the binary value of each of the data items delivered by a source of data to be transmitted.

2. A system according to claim 1, in which said two binary values are represented by bits which have the same value and waveform as one another but which are of opposite polarity to one another.

3. A system according to claim 1, in which one of the binary values is the value corresponding to zero signal.

4. A system according to claim 3, in which said line coupling means comprise a first circuit, comprising serially connected inductances in each line, and a second circuit inductively coupled with the first circuit and closed by a load resistance, the inductances and resistances and the mutual inductances between said first circuit and said second circuit being such that the series impedances introduced into the lines are substantially real and are at most equal to one-tenth of the characteristic impedance of the lines; and the second circuits respectively coupled with either line are at each transmitting station coupled together by amplifying one-way gating circuit whose conductive or nonconductive state depends upon the binary value of each of the data items delivered by said data source.

5. A system according to claim 4, in which said first circuit comprises at least one primary winding of a transformer and said second circuit comprises at least one secondary winding of a transformer.

6. A system according to claim 4, in which said gating circuit is also controlled by an auxiliary circuit delivering control signals derived from the sync frames received from said first line and which make said gating circuit conductive only during selected time slots in the operating cycle.

7. A system according to claim 6, in which said auxiliary circuit comprises a decoding matrix controlled by a binary counter whose input receives via a time differentiation circuit the sync bits in the sync frames received from said first line.

8. A system according to claim 1, in which said comparing means at each receiving station comprise a comparator circuit having two inputs and one output, at which a signal is output only when signals of substantially identical value and waveform are applied simultaneously to latter said two inputs.

9. A system according to claim 8, in which sampling and storage means are used in association with the output signal from the comparator circuit, and in which there is provided a circuit for gating the stored samples and controlled by sync pulses received from the first line, the latter circuit being operative only during selected time slots in the operating cycle.

10. A system according to claim 9, in which latter said gating circuit is controlled by a decoding matrix controlled by a binary counter which receives at its input via a time differentiation circuit the sync bits in the sync frames received from the first line.